Nov. 25, 1958     O. M. WHITTEN     2,861,427
BOOSTER DEVICE

Filed Sept. 8, 1953     4 Sheets-Sheet 1

INVENTOR.
OWEN M. WHITTEN.

BY

ATTORNEYS

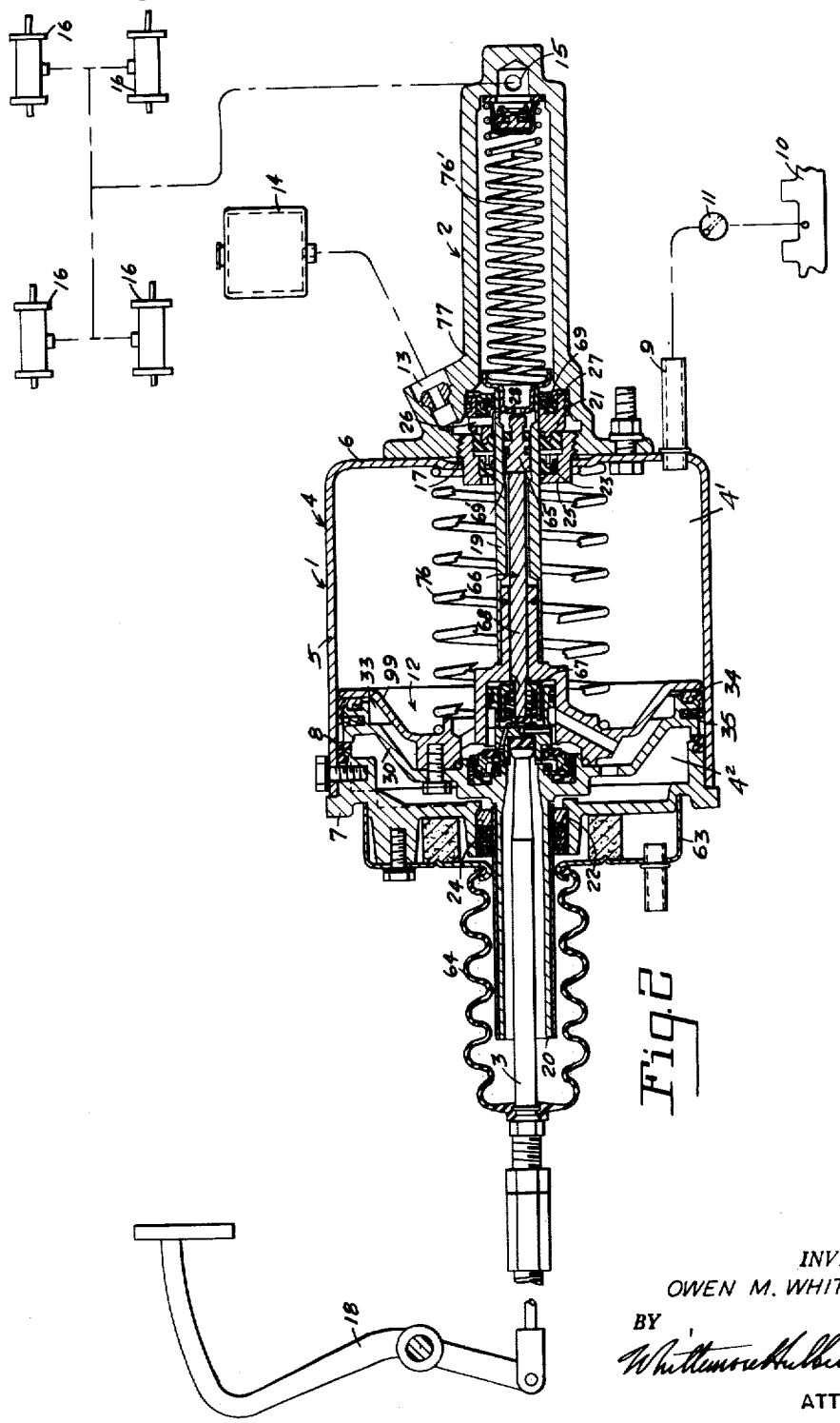

INVENTOR.
OWEN M. WHITTEN.
BY
ATTORNEYS

Nov. 25, 1958  O. M. WHITTEN  2,861,427
BOOSTER DEVICE
Filed Sept. 8, 1953  4 Sheets-Sheet 4

INVENTOR.
OWEN M. WHITTEN.
BY
*Whittemore Hulbert & Belknap.*
ATTORNEYS

United States Patent Office 2,861,427
Patented Nov. 25, 1958

2,861,427
BOOSTER DEVICE

Owen M. Whitten, Detroit, Mich., assignor to Kelsey-Hayes Company, a corporation of Delaware Application September 8, 1953, Serial No. 378,869

8 Claims. (Cl. 60—54.6)

The invention relates to booster devices for hydraulic systems and refers more particularly to booster devices for hydraulic brake systems of automotive vehicles in which the booster and hydraulic cylinder are incorporated to form a booster unit and the booster unit is brought into operation by the actuation of a manually operable element, such as a foot pedal.

The invention has for one of its objects to provide an improved booster device in which the booster has a power piston movable under differential pressure of fluid on its opposite sides to create pressure in the hydraulic cylinder and in which the booster is operable after forward movement of the power piston has been arrested to increase the pressure in the hydraulic cylinder in the event that the means for creating the lower pressure of fluid becomes inoperative.

The invention has for another object to provide an improved booster device in which the power piston is movable under differential pressure of air on its opposite sides to create pressure in the hydraulic cylinder, the pressure at one side being created by a source of vacuum, and in which the booster is operable after forward movement of the power piston has been arrested to increase the pressure in the hydraulic cylinder in the event that the source of vacuum ceases to operate.

The invention has for still another object to provide an improved booster device which is so constructed that when the forward movement of the power piston under differential fluid pressure is arrested and the source of lower fluid pressure becomes inoperative, fluid under the higher pressure is prevented from passing to either side of the power piston thereby maintaining the pressure conditions at both sides of the power piston with the result that increase of pressure in the hydraulic cylinder may be secured by means of the power piston as long as there is a possibility of securing a greater differential fluid pressure on the power piston.

The invention has for a further object to provide an improved booster device having an air inlet passage and an air valve element provided with a portion for sealing the air inlet passage and with air passage means for the passage of air from the air inlet passage, when unsealed or open, to the opposite sides of the power piston, and also having means for sealing the air passage means to prevent the passage of air from the unsealed or open air inlet passage to either side of the power piston.

With these and other objects in view, the invention resides in the novel features of construction and combinations and arrangements of parts, as more fully hereinafter set forth.

In the drawings:

Figure 2 is a cross-section on the line 2—2 of Figure 1;

Figure 1:
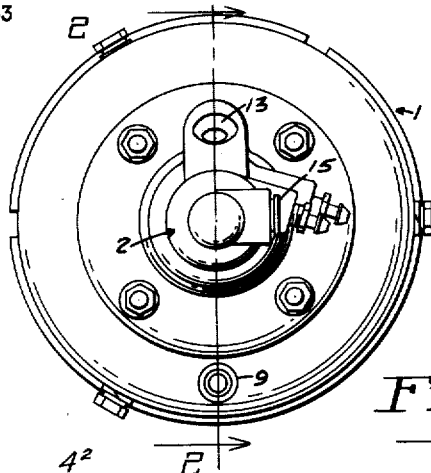
Figure 1 is a front end view of a booster device embodying the invention.

As illustrated in the drawings, the booster device comprises the booster 1, the hydraulic cylinder 2, and the manually operable actuating rod 3. The booster has the casing 4 formed with the cylindrical side wall 5, the integral end wall 6 at its front end and the closure 7 secured to its rear end, there being a suitable seal 8 between the closure and side wall. The end wall is provided with a vacuum port 9 which is adapted to be connected to a suitable source of vacuum, such as the intake manifold 10 of an internal combustion engine of an automotive vehicle. A conventional check valve 11 is provided in the line to the intake manifold permitting the passage of air through the line to the intake manifold but preventing flow of air in the reverse direction. The booster also has the power piston 12 reciprocable within the cylindrical side wall 5 and cooperating with the casing 4 to define the vacuum and variable pressure chambers 4' and 4², respectively at the front and rear sides of the power piston. The hydraulic cylinder 2 is secured to the front end wall 6 of the casing and has the braking liquid inlet port 13 near its rear end adapted to be connected to a reservoir 14 for braking liquid and the braking liquid outlet port 15 near its front end adapted to be connected to a hydraulic motor 16, such as wheel cylinder for operating a brake of the automotive vehicle. A suitable seal 17 is provided between the hydraulic cylinder and the end wall. The actuating rod 3 extends axially of and rearwardly from the booster and is adapted to be connected to a manually operable element 18, such as a foot pedal.

The power piston 12 is guided by the axially aligned tubular power plunger 19 and tubular stem 20, the power plunger slidably engaging the bearing 21 at the rear end of the cylinder 2 and the stem slidably engaging the bearing 22 in the closure 7. Suitable seals 23 and 24 respectively between the power plunger 19 and the nut 25 at the rear end of the cylinder and between the stem 20 and the closure are provided. The bearing 21 has the braking liquid inlet port 26 registering with the port 13. The power plunger is secured to and extends forwardly from the power piston 12 at its inner periphery through the bearing 21 and the seal 27 at the front side of the bearing 21 into the cylinder 2 and has near its front end the port 28 which in the retracted position of the power plunger registers with the port 26 and in the operative position is located forwardly of this port so that communication of the cylinder 2 with the reservoir 14 is cut off. The stem 20 is integral with and extends rearwardly from the power piston 12 at its inner periphery.

The power piston 12 comprises the front and rear sections 29 and 30 respectively secured to each other intermediate their inner and outer peripheries, the front section having the rearwardly extending annular boss 31 abutting and secured to the rear section with a suitable sealing ring 32 therebetween. The rear section has at its outer periphery the channel 33 which clamps the radial flange of the angle-shaped sealing ring 34 against the front section, the sealing ring having a peripheral annular flange slidably engaging the side wall 5. The channel also receives suitable lubricating wicking 35 pressing against the annular flange of the sealing ring. The portions of the sections between the boss 31 and the channel 33 are axially spaced from each other. The power piston 12 is formed with a central valve chamber having an air inlet passage. This valve chamber is formed by providing the front section 29 with the reduced chamber portion 36 and the enlarged chamber portion 37 and by providing the rear section 30 with the annular chamber portion 38. The reduced chamber portion 36 is formed by the generally cylindrical side wall 39 and the integral end wall 40 at the front end of the side wall. The enlarged chamber portion 37 is in rear of and opens into the reduced chamber portion and is bounded or enclosed by the annular boss 31. The annular chamber portion 38 is formed by the annular flange 41 at the inner periphery of the rear section, the radial wall portion 42 and the cylindrical wall portion 43, part of which telescopes within the boss 31. The annular flange 41 extends forwardly from the radial wall portion 42 and has at its front end the air inlet passage 44 in communication with the interior of the stem 20.

The front section 29 is provided with the axially extending vacuum passages 45 radially outwardly of the side wall 39 placing the enlarged chamber portion 37 in communication with the interior of the casing 4 at the front side of the power piston 12. The front section is also provided with the generally radially extending air passages 46 leading from the reduced chamber portion 36 to the space between the front and rear sections radially outwardly of the annular boss 31. The rear section 30 is provided with the axially extending air passages 47 radially outwardly of the annular chamber portion 38 and communicating with the space between the front and rear sections radially outwardly of the annular boss 31. These air passages and space cooperate with the air passages 46 to place the reduced chamber portion 36 in communication with the interior of the casing 4 at the rear side of the power piston 12.

The valve mechanism for controlling the operation of the booster comprises the vacuum valve element 48, the air valve element 49 and the annular floating seal 50 engageable with the vacuum and air valve elements. The vacuum valve element is formed by an annular rib extending rearwardly from the side wall 39 into the enlarged chamber portion 37 and adapted to make sealing contact with the floating seal. The air valve element is a cup-shaped piston extending within the reduced chamber portion 36 and having the side wall 51, the end wall 52 near the rear end of the side wall and the rearwardly extending annular flange or hub 53 of smaller diameter. The front end and rear end portions of the side wall 51 are enlarged and slidably engage the side wall 39, there being an O-ring 54 between the front end portion and side wall and the rear end portion having the axial grooves 55 providing air passages between the rear end portion and the side wall. The end wall 52 has the annular rearwardly extending rib 56 immediately adjacent the grooves 55 adapted to make sealing contact with the floating seal 50. The floating seal is preferably formed of rubber and is mounted on the radial flange of the ring 57 of angle cross-section, and a flexible diaphragm 58 is secured at its outer edge to the axial flange of the ring and at its inner edge to the annular flange 41, the diaphragm serving to seal the portion of the annular chamber 38 rearwardly of the diaphragm from direct communication with the air inlet passage 44. The annular seal 50 is axially urged forwardly toward the vacuum valve element 48 and air valve element 49 by means of the coil spring 59 abutting the wall portion 42 of the annular chamber portion 38 and a peripheral flange of the cup-shaped member 60 encircling and abutting the rear end of the ring 57.

The actuating rod 3 has its front end located inside the annular flange or hub 53 and abutting the sound deadening disc 61 which abuts the end wall 52 of the air valve element. The actuating rod extends rearwardly within the annular flange 41 and tubular stem 20 and beyond the latter, and is of smaller diameter so that air may freely pass through the stem and flange to the air inlet passage 44. This air is filtered by the filter 62 between the cover 63 and closure 7, the air after passing through the filter passing through the space between the stem 20 and the boot 64 into the stem.

To transmit hydraulic pressure created within the hydraulic cylinder 2 to the actuating rod 3, hydraulic pressure reaction means is provided. This reaction means comprises the reaction piston 65 and the reaction rod device 66, which is formed of the cup-shaped reaction member 67 and the reaction rod 68. The reaction piston 65 is located within and slidably engages the forward end portion of the power plunger 19 and is exposed to the pressure of the braking liquid in the cylinder 2. The sealing ring 69 and the O-ring 69' seal the joint between the piston and power plunger. The cup-shaped reaction member 67 is located within the reduced chamber portion 36 and extends within the air valve element 49 and has its bottom wall engageable with the sound deadening disc 70 upon the end wall 40 and its side wall extending rearwardly from its bottom wall. The reaction rod 68 has the reduced rear end portion 71 extending through the bottom wall of the cup-shaped reaction member 67 and the annular shoulder 72 abutting the front side of the bottom wall. The reaction rod 68 extends freely within the hub 73 and power plunger 19 to provide a clearance space therebetween. The hub provides the connection between the power plunger and the power piston, the hub being integral with and extending forwardly from the end wall 40 and the power plunger being sleeved over and having a press fit with the hub. The clearance space between the reaction rod and the hub and power plunger communicates with the interior of the cup-shaped reaction member 67 by means of the axial grooves 74 in the reaction rod, these grooves extending beyond the front and rear sides of the bottom wall of the cup-shaped reaction member 67. The reaction piston 65 through the reaction rod 68 is adapted to move the cup-shaped reaction member 67 rearwardly to engage the rear end of its side wall with the end wall 52 of the air valve 49 thereby urging the air valve and the sound deadening disc 61 rearwardly and transmitting rearward pressure to the actuating rod 3 thereby producing feel upon the foot pedal 18.

A coil spring 75 extends within the cup-shaped reaction member 67 and abuts its bottom wall and the end wall 52 of the air valve element 49, this coil spring resiliently urging the air valve element rearwardly and the cup-shaped reaction member forwardly. In the present instance, this spring controls the forward force that must be exerted upon the actuating rod 3 to move the air valve element forwardly and start the operation of the booster. Also, this spring resists the rearward movement of the reaction piston 65 and reaction rod device 66 and controls the hydraulic pressure in the cylinder 2 that must be exerted upon the reaction piston to overcome this spring and move the cup-shaped reaction member 67 rearwardly against the end wall 52 of the air valve element 49.

A coil spring 76 is located between the closed end 6 of the casing 4 and the power piston 12 and 76' is a coil spring located within the hydraulic cylinder 2, both springs serving to retract the power piston 12 and the power plunger 19 and the coil spring 76' acting through the cup-shaped member 77 to prevent the reaction piston 65 from moving out of the power plunger.

To provide for gradually increasing the pressure required to initially move the power piston forwardly from its off or retracted position and thereby secure a smooth acting booster, the air valve element 49 is provided with means for sealing the air inlet passage 44 in the off position of the parts and is also provided with air passage means, a portion of which is restricted, for placing the space between the annular flange or hub 53 of the air valve element and the floating seal 50 in communication with the reduced chamber portion 36. In detail, the annular flange or hub 53 has a diameter substantially the same as that of the front end of the annular flange 41 and has secured to its rear end the annular seal 78, preferably formed of rubber, adapted to abut the rear end of the annular flange 41 and seal the air inlet passage 44 in the off position of the air valve element. Also, the end wall 52 has the generally axially extending air passages 79 between the annular flange or hub 53 and the annular rib 56 and leading from the space between the annular flange or hub 53 and the floating seal 50 to the space inside the air valve element. Further, the end wall 52 has an air metering passage 80 leading from the space inside the air valve element to the reduced chamber portion 36, the passage having the restricted axial portion 81 at the center or axis of the air valve element and the communicating radial portion 82 leading to the reduced chamber portion 36. All air passing through the air inlet passage 44 to the reduced chamber portion 36 from the time the air inlet passage is unsealed or open until the air valve element 49 is moved forwardly out of contact with the floating seal 50 is metered by the restricted axial portion 81 of the air passage 80. This air passage 80 in the off position of the parts also places the interior of the power plunger 19 immediately in rear of the reaction piston 65 in communication with the interior of the casing 4 at the front side of the power plunger 12. Since this portion of the casing under normal operating conditions is under vacuum the rear end of the reaction piston is subject to vacuum and is held against the front end of the reaction rod.

For the purpose of making the booster operable to increase the pressure in the hydraulic cylinder after forward movement of the power piston has been arrested in the event that the internal combustion engine has stopped and is no longer creating vacuum, means is provided to seal the air passage means within the air valve element so that air cannot flow into the interior of the casing either in front or rear of the power piston. In detail, 83 is a cup-shaped seal extending over the rear end of the reaction rod 68. This seal is preferably formed of rubber and has the rear face of its bottom made concave to provide an annular bead 84 at the periphery for engaging the portion of the end wall 52 of the air valve element surrounding and spaced from the restricted axial portion 81 of the air passage 80. The seal is flexible so that the bead 84 may engage the end wall 52 prior to engagement of the rear end of the side wall of the cup-shaped reaction member 67 with the end wall 52 and then be distorted until the side wall firmly engages the end wall. The cup-shaped seal 83 being mounted on and movable with the hydraulic pressure reaction means automatically seals the restricted air passage after the power piston has been moved forwardly and sufficient hydraulic pressure is created in the hydraulic cylinder to move the hydraulic pressure reaction means rearwardly. As a result, the pressure conditions within the interior of the casing 4 at the front and rear sides of the power piston cannot be affected or changed at this time when the forward movement of the power piston is arrested. Therefore, as long as there is a possibility of securing a greater differential air pressure on the power piston by increase of the pressure in rear of the power piston faster than increase of pressure in front of the power piston, pressure in the hydraulic cylinder may be increased by means of the power piston by again moving the actuating rod 3 forwardly to move the air valve element 49 forwardly out of engagement with the floating seal 50.

Figure 3:
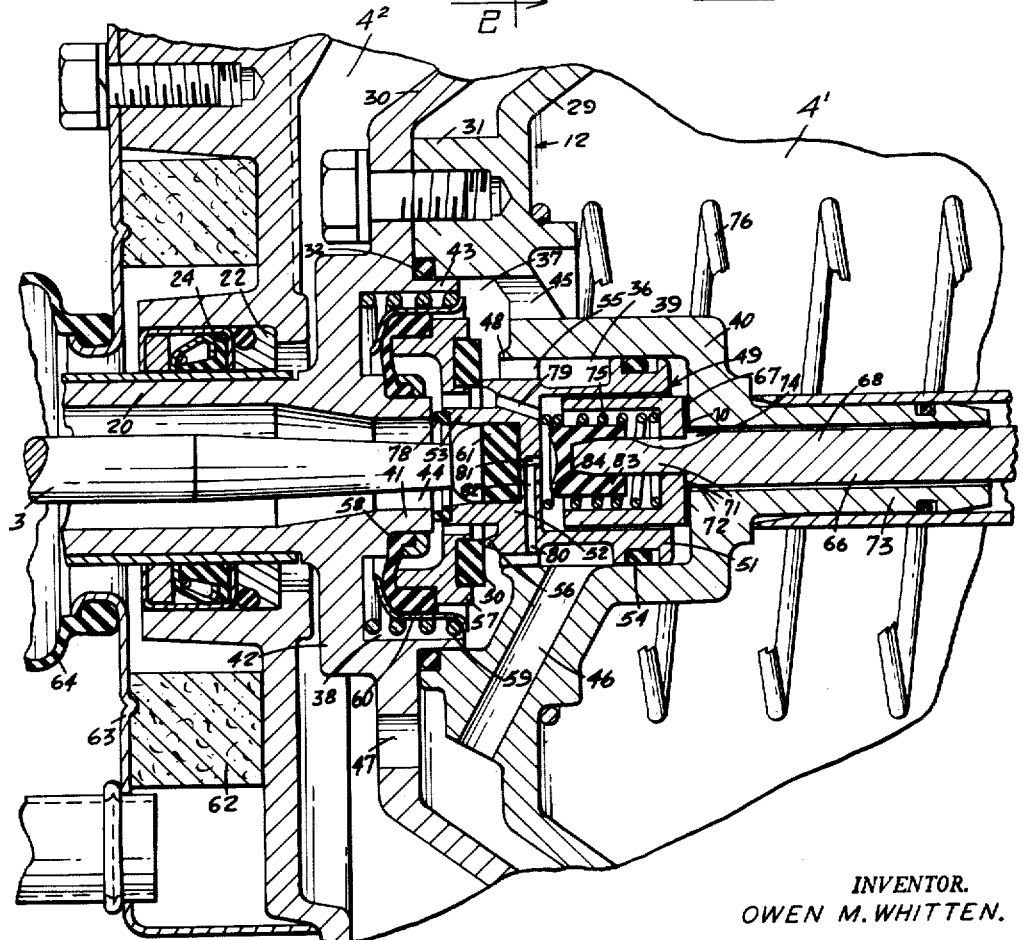
Figures 3, 4, 5 and 6 are enlarged views of a portion of Figure 2 showing the parts in different positions.

Assuming the parts to be in the off position as shown in Figures 2 and 3 and the internal combustion engine of the automotive vehicle running, the air inlet passage 44 is sealed and the interior of the casing 4 at the front side of the power piston 12 is under vacuum and this same pressure is present throughout the entire central chamber of the piston, the interior of the casing 4 at the rear side of the power piston 12 and also the space surrounding the reaction rod 68 with the rear end of the reaction piston 65 subject to vacuum holding the rear end against the front end of the reaction rod.

Figure 4:
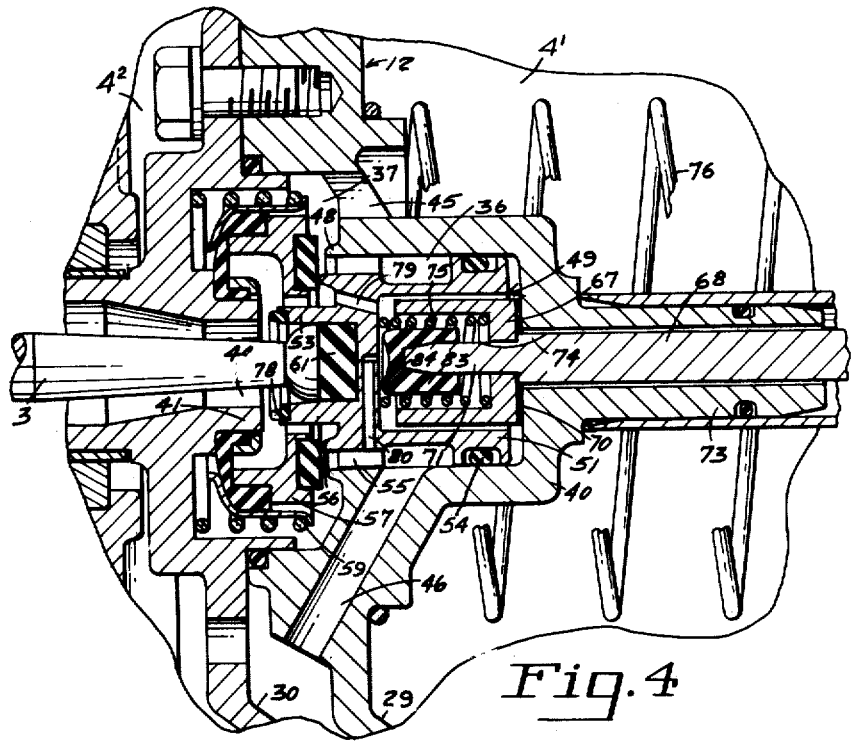

Upon forward movement of the actuating rod 3 against the resistance of the coil spring 75, the air valve element 49 is moved forwardly to allow air to pass through the air inlet passage 44 into the interior of the air valve element and this air reacts upon the air valve element to assist the coil spring in resisting forward movement of the air valve element and to thereby additionally impart feel to the foot pedal 18 through the actuating rod. During the initial portion of this forward movement, the floating seal 50 remains in contact with the air valve element, as shown in Figure 4, and all air entering through the air inlet passage 44 passes through the restricted axial portion 81 of the air passage 80. Some of the air is withdrawn past the vacuum valve element 48 and through the vacuum passages 45 into the interior of the casing 4 at the front side of the power piston 12 and the remainder of the air passes through the air passages 46 and 47 and the intermediate space between the front and rear sections 29 and 30 to the interior of the casing 4 at the rear side of the power piston 12. As a result, there is a gradual flow of air to the interior of the casing at the rear side of the power piston. As the floating seal 50 more closely approaches the vacuum valve element 48, the rate of flow of air to the interior of the casing at the rear side of the power piston increases until the floating seal firmly engages the vacuum valve. At the instant the vacuum valve element is engaged by the floating seal and the vacuum valve is closed, the seal is still in engagement with the air valve element, as shown in Figure 5, so that the air entering through the air inlet passage 44 is still gradually passing through the metering port 80 to the interior of the casing at the rear side of the power piston.

Upon continued forward movement of the air valve element 49 by the actuating rod 3, the air valve element leaves the floating seal 50 which remains against the vacuum valve element 48 so that air entering the air inlet passage 44 may now also pass through the grooves 55 of the air valve element to the interior of the casing at the rear side of the power piston 12 thereby materially increasing the rate of flow of air. Since air surrounds the rear end portion of the air valve element 49, the movement of the air valve element away from the floating seal 50 is facilitated and may be effected relatively gradually instead of abruptly.

Figure 5:
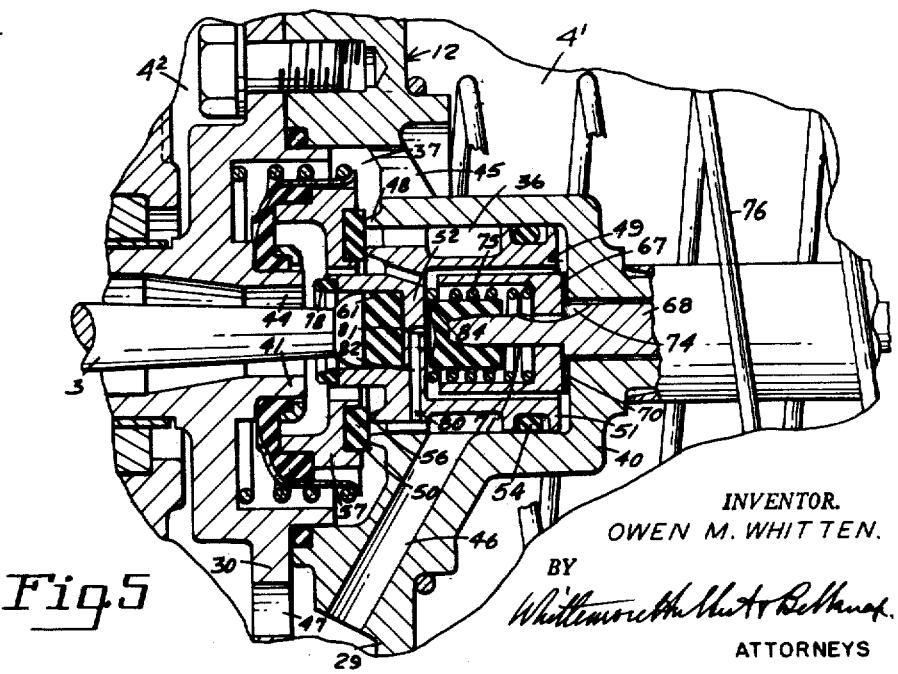
Figure 6:
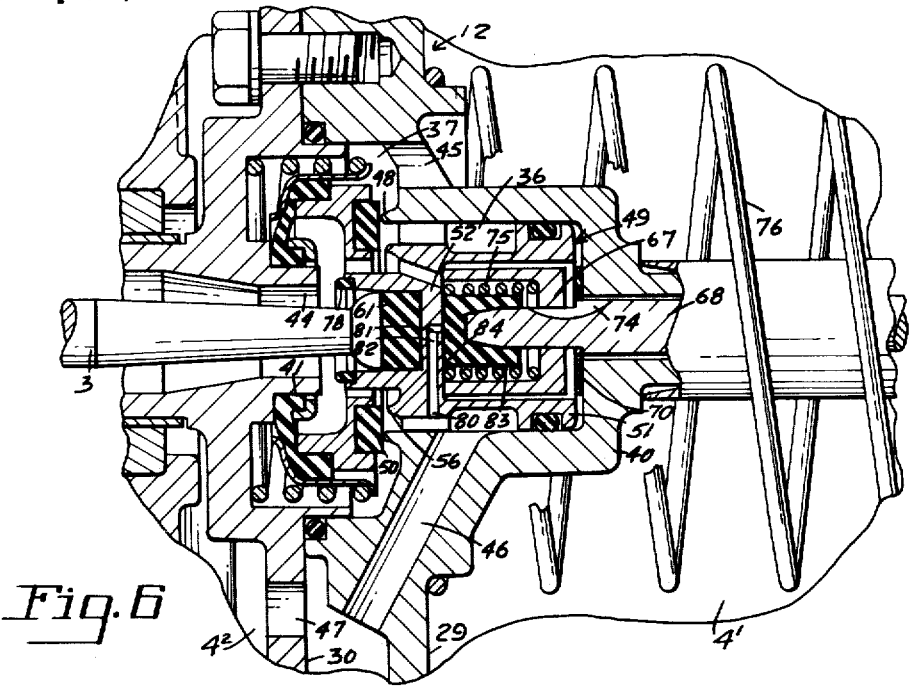

During the interval the air valve element 49 is being moved forwardly by the actuating rod 3 from the position shown in Figure 3 to the position shown in Figure 5, air gradually flows into the interior of the casing 4 in front and rear of the power piston 12 and gradually increases the pressure in rear of the power piston at a materially faster rate than the pressure in front of the power piston increases. During the continued forward movement of the air valve element by the actuating rod from the position shown in Figure 5, air flows at a faster rate into the interior of the casing at the rear only of the power piston and increases the pressure at the rear sufficiently to initiate forward movement of the power piston.

During this forward movement, the braking liquid ports 26 and 13 are cut off after which the power plunger 19 creates hydraulic pressure within the hydraulic cylinder 2. When this hydraulic pressure is raised sufficiently to overcome the coil spring 75 the reaction piston 65 acting through the reaction rod device 66 moves the cup-shaped seal 83 to engage its bead 84 with the end wall 52 of the air valve element 49 thereby sealing the air metering passage 80. Then, the reaction rod 68 moves the end of the side wall of the cup-shaped reaction member 67 against the end wall of the air valve, the bead 84 still effecting the sealing but being distorted or displaced to permit the cup-shaped reaction member to firmly engage the end wall. When the cup-shaped reaction member 67 engages the end wall 52, the hydraulic pressure within the hydraulic cylinder 2 reacts through the end wall upon the actuating rod 3 to resist its continued forward movement to thereby impart feel to the foot pedal. Increase of the hydraulic pressure within the hydraulic cylinder can be secured by moving the actuating rod forwardly with the power piston to hold the air valve element forwardly and allow extra air to enter the casing in rear of the power piston until the pressure becomes atmospheric.

If forward movement of the actuating rod 3 is discontinued and the actuating rod is held from moving rearwardly, the power piston 12 moves forwardly until the floating seal 50, which is in engagement with the vacuum valve element 48, engages the air valve element 49 so that forward movement of the power piston is arrested. The valve mechanism at this time is in the position shown in Figure 5 but the power piston has been moved forwardly. Since the air metering passage 80 is sealed, air cannot pass to the interior of the casing 4 at the rear side of the power piston. Since the vacuum and air valves are also sealed, air cannot pass to the interior of the casing at the front side of the power piston. As a result, the pressure conditions within the casing at the front and rear sides of the power piston are maintained with the internal combustion engine running or stopped, the check valve in the line between the booster and the intake manifold preventing air from passing to the booster. Therefore, as long as there is a possibility of securing a greater differential air pressure on the power piston 12 by increasing or raising the pressure at the rear side of the power piston faster than the pressure at the front side of the power piston is increased or raised, assuming the internal combustion engine to be stopped, the actuating rod 3 can be manually moved forwardly to move the air valve element 49 forwardly away from the floating seal 50 and allow air to pass to the interior of the casing at the rear side of the power piston so that the power piston will be moved forwardly to create additional pressure in the hydraulic cylinder. This forward movement will continue until the pressure in the hydraulic cylinder balances the sum of the pressure exerted by the power piston 12 through the power plunger and the pressure exerted by the actuating rod 3 through the reaction piston 65.

Figures 7, 8:
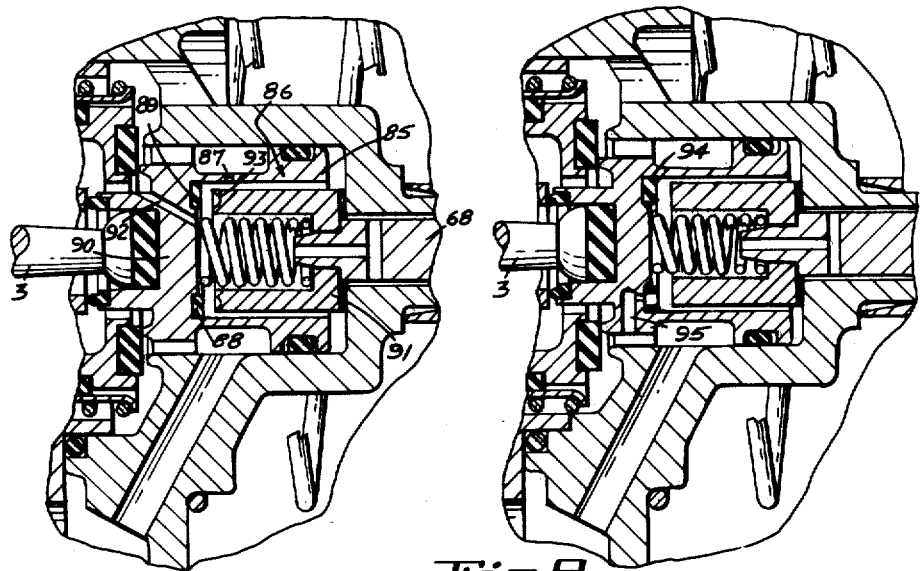
Figures 7 and 8 are views similar to Figure 3 showing modifications.

Figure 7 illustrates a modification which differs from the booster device of Figures 1 to 6, inclusive, by forming the side wall 85 of the air valve element 86 with the restricted air metering passage 87 and mounting the flexible annular seal 88 in the annular groove 89 in the end wall 90 of the air valve element and extending beyond the end wall for engagement by the rear end of the side wall of the cup-shaped reaction member 91. The annular groove is in the front face of the end wall 90 radially outside the generally axially extending air passages 92 in the end wall and the rear end of the side wall of the cup-shaped reaction member 91 has the annular groove 93 for receiving some of the material of the seal displaced by the cup-shaped reaction member during its rearward movement into firm contact with the end wall. With this construction, the annular seal, which is preferably formed of rubber, can effectively seal communication between the generally axial air passages in the end wall of the air valve and the air metering passage in the side wall of the air valve.

Figure 8 illustrates another modification differing from the booster device of Figures 1 to 6, inclusive, by providing the flexible annular seal 94 similar to the annular seal 88 of Figure 7 and by providing the air metering passage 95 having a portion extending through the seal.

What I claim my invention is:

1. A booster device comprising a casing, a hydraulic cylinder at the front end of said casing, a power piston movable forwardly in said casing under differential air pressure and defining vacuum and variable pressure chambers at the front and rear sides of said power piston, said power piston being provided with a valve chamber having an air inlet passage and vacuum and variable pressure chambers and said valve chamber, a power plunger movable by said power piston into said hydraulic cylinder, valve mechanism within said valve chamber for controlling the passage of air from said air inlet passage to said vacuum and air passages, said valve mechanism comprising a vacuum valve element on said power piston, a relatively movable air valve element, and a floating seal engageable with said vacuum and air valve elements and movable toward and away from said vacuum valve element, said seal serving as one element cooperating with said vacuum and air valve elements to form vacuum and air valves, said air valve element having a portion for sealing said air inlet passage in the off position of said power piston and valve mechanism, said air valve element also having air passage means for the passage of air from said air inlet passage to said vacuum passage during the forward movement of said air valve element and seal until said seal contacts said vacuum valve element and to said first-mentioned air passage during the forward movement of said air valve element and seal, hydraulic pressure reaction means between said cylinder and air valve element and exposed to the hydraulic pressure in said hydraulic cylinder, and a second seal engageable with said air valve element and hydraulic pressure reaction means to seal said air passage means of said air valve element when a predetermined pressure is created in said hydraulic cylinder.

2. A booster device comprising a casing, a hydraulic cylinder at the front end of said casing, a power piston movable forwardly in said casing under differential air pressure and defining vacuum and variable pressure chambers at the front and rear sides of said power piston, said power piston being provided with a valve chamber having an air inlet passage and vacuum and air passages respectively between said vacuum and variable chambers and said valve chamber, a power plunger movable by said power piston into said hydraulic cylinder, valve mechanism within said valve chamber for controlling the passage of air from said air inlet passage to said vacuum and air passages, said valve mechanism comprising a vacuum valve element on said power piston, a relatively movable air valve element and a floating seal engageable with said vacuum and air valve elements and movable toward and away from said vacuum valve element, said seal serving as one element cooperating with said vacuum and air valve elements to form vacuum and air valves, said air valve element having air passage means for the passage of air from said air inlet passage to said vacuum passage and first-mentioned air passage, and means acted on by the pressure in said hydraulic cylinder including a second seal for sealing said air passage means of said air valve element when a predetermined pressure is created in said hydraulic cylinder.

3. A booster device comprising a casing, a hydraulic cylinder at the front end of said casing, a power piston movable forwardly in said casing under differential air pressure and defining vacuum and variable pressure chambers at the front and rear sides of said power piston, said power piston being provided with a valve chamber having an air inlet passage and vacuum and air passages respectively between said vacuum and variable pressure chambers and said valve chamber, a power plunger movable by said power piston into said hydraulic cylinder, valve mechanism within said valve chamber for controlling the passage of air from said air inlet passage to said vacuum and air passages, said valve mechanism comprising a vacuum valve element on said power piston, a relatively movable air valve element, and a floating seal engageable with said vacuum and air valve elements and movable toward and away from said vacuum valve element, said seal serving as one element cooperating with the vacuum and air valve elements to form vacuum and air valves, said air valve having a portion for sealing said air inlet passage in the off position of said power piston and valve mechanism, and air passage means for the passage of air from said air inlet passage to said vacuum passage during the forward movement of said air valve element and seal until said seal contacts said vacuum valve element and to said first-mentioned air passage during the forward movement of said air valve element and seal, hydraulic pressure reaction means between said cylinder and air valve element and exposed to the hydraulic pressure in said hydraulic cylinder, and a second seal carried by said hydraulic pressure reaction means and engageable with said air valve element to seal said air passage means of said air valve element when a predetermined pressure is created in said hydraulic cylinder.

4. A booster device for a hydraulic brake system comprising a casing, a hydraulic cylinder at the front end of said casing, a power piston movable forwardly in said casing under differential air pressure and defining vacuum and variable pressure chambers at the front and rear sides of said power piston, said power piston being provided with a valve chamber having an air inlet passage and vacuum and air passages respectively between said vacuum and variable pressure chambers and said valve chamber, valve mechanism within said valve chamber comprising a vacuum valve element on said power piston, a piston-like air valve element and an axially movable floating seal resiliently urged toward and engageable with said vacuum and air valve elements, said seal serving as one element cooperating with said vacuum and air valve elements to form vacuum and air valves, said air valve element having a cup-shaped portion with an end wall and a portion extending rearwardly from said end wall for sealing said air inlet passage, an air passage through said end wall for placing said air inlet passage in communication with the interior of said cup-shaped portion and a second air passage placing the interior of said cup-shaped portion in communication with said valve chamber, hydraulic pressure reaction means between said hydraulic cylinder and air valve element and exposed to the hydraulic pressure in said hydraulic cylinder, and a second seal within said air valve element and mounted on said end wall between said air passages of said air valve element, said second seal being engageable by said hydraulic pressure reaction means to seal communication between said last-mentioned air passages when a predetermined pressure is created in said hydraulic cylinder.

5. A hydraulic pressure producing device comprising a casing, a hydraulic cylinder, a pressure responsive power piston in said casing defining vacuum and variable pressure chambers, a pressure transmitting member acted on by said power piston and having a fluid displacing portion in said hydraulic cylinder, a manually operable member controlling the operation of said power piston, valve means operated by said manually operable member for controlling the connection of the variable pressure chamber to the vacuum chamber and to air at atmospheric pressure, air passage means for the passage of air to said variable pressure chamber, a reaction device subject to pressure developed in said hydraulic cylinder for transmitting a proportional reaction force to said manually operable member, and means operable by said reaction device to seal said air passage means to the variable pressure chamber in response to the creation of a predetermined pressure in said hydraulic cylinder.

6. A booster device comprising a casing, a hydraulic cylinder at the front end of said casing, a power piston movable forwardly in said casing under differential air pressure and defining vacuum and variable pressure chambers at the front and rear sides of said power piston, said power piston having vacuum and air passages respectively leading to said vacuum and variable pressure chambers and an air inlet passage, a power plunger movable by said power piston into said hydraulic cylinder, valve mechanism carried by said power piston for controlling passage of air from said air inlet passage to said vacuum and air passages, said valve mechanism having air passage means for the passage of air from said air inlet passage to said vacuum passage and first-mentioned air passage, and means acted on by the pressure in said hydraulic cylinder including a seal for sealing said air passage means of said valve mechanism when a predetermined pressure is created in said hydraulic cylinder.

7. A hydraulic pressure producing device comprising a casing, a hydraulic cylinder, a pressure responsive power piston in said casing defining vacuum and variable pressure chambers, a pressure transmitting member acted on by said power piston and having a fluid displacing portion in said hydraulic cylinder, valve means for controlling the connection of the variable pressure chamber to the vacuum chamber and to air at atmospheric pressure, air passage means for the passage of air to said variable pressure chamber, and means acted on by the pressure in said hydraulic cylinder including a seal for sealing said air passage means when a predetermined pressure is created in said hydraulic cylinder.

8. A hydraulic pressure producing device comprising a casing, a hydraulic cylinder, a pressure responsive power piston in said casing defining vacuum and variable pressure chambers, a pressure transmitting member acted on by said power piston and having a fluid displacing portion in said hydraulic cylinder, valve means for controlling the connection of the variable pressure chamber to the vacuum chamber and to air at atmospheric pressure, air passage means for the passage of air to said variable pressure chamber, and means acted on by the pressure in said hydraulic cylinder including a seal for sealing said air passage means when a predetermined pressure is created in said hydraulic cylinder, said air passage means having a portion thereof in said valve means and said seal being engageable with said valve means to seal said air passage means.

References Cited in the file of this patent

UNITED STATES PATENTS

| 2,260,491 | Stelzer | Oct. 28, 1941 |
| 2,365,471 | Ingres | Dec. 19, 1944 |
| 2,374,545 | Ingres | Apr. 24, 1945 |
| 2,532,960 | Stelzer | Dec. 5, 1950 |
| 2,763,989 | Ayers | Sept. 25, 1956 |